United States Patent [19]

Guerdoux et al.

[11] Patent Number: 4,868,052

[45] Date of Patent: Sep. 19, 1989

[54] THERMOPLASTIC COMPOSITION COMPRISING A COPOLYMER BASED ON ETHYLENE AND MALEIC ANHYDRIDE, AND INDUSTRIAL ARTICLES OBTAINED FROM SUCH A COMPOSITION

[75] Inventors: Lionel Guerdoux, Lillebonne; Marius Hert, Aubigny en Artois, both of France

[73] Assignee: Societe Chimique des Charbonnages S.A., France

[21] Appl. No.: 118,030

[22] Filed: Nov. 6, 1987

Related U.S. Application Data

[63] Continuation-in-part of Ser. No. 6,543, filed as PCT FR86/00134 on Apr. 22, 1986, published as WO86/06394 on Nov. 6, 1986, abandoned.

[30] Foreign Application Priority Data

Apr. 24, 1985 [FR] France .................................. 85 06203

[51] Int. Cl.$^4$ .................... B32B 15/08; B32B 27/08; B32B 27/28; C08L 23/04

[52] U.S. Cl. .................................. 428/336; 428/337; 428/461; 428/463; 428/516; 428/520; 428/416; 525/207

[58] Field of Search ............... 428/416, 516, 461, 336, 428/337, 520

[56] References Cited

U.S. PATENT DOCUMENTS

| | | | |
|---|---|---|---|
| 3,410,928 | 11/1968 | Baum | 525/221 |
| 3,658,948 | 4/1972 | McConnell | 260/897 B |
| 4,275,180 | 6/1981 | Clarke | 525/176 |
| 4,452,942 | 6/1984 | Shida et al. | 525/74 |
| 4,619,969 | 10/1986 | Doi et al. | 525/93 |
| 4,623,567 | 11/1986 | Hert | 428/36 |
| 4,684,576 | 8/1987 | Tabor et al. | 525/74 |

FOREIGN PATENT DOCUMENTS

| | | | |
|---|---|---|---|
| 55-069448 | 5/1980 | Japan | 428/416 |
| 55-130757 | 10/1980 | Japan | 428/416 |

Primary Examiner—Carman J. Seccuro
Attorney, Agent, or Firm—Finnegan, Henderson, Farabow, Garrett & Dunner

[57] ABSTRACT

A thermoplastic composition comprising an uncrosslinked blend of (A) from 1 to 80 weight percent of at least one partially crystalline polymer or copolymer of ethylene, having a density lying between 0.870 and 0.945, and (B) from 20 to 99 weight percent of at least one hydrophobic, non-elastomeric, random or graft copolymer.

7 Claims, No Drawings

THERMOPLASTIC COMPOSITION COMPRISING A COPOLYMER BASED ON ETHYLENE AND MALEIC ANHYDRIDE, AND INDUSTRIAL ARTICLES OBTAINED FROM SUCH A COMPOSITION

This application is a CIP of application Ser. No. 6,543 filed as PCT FR86/00134 on Apr. 22, 1986, published as WO86/06394 on Nov. 6, 1986, now abandoned.

The present invention relates to thermoplastic compositions comprising a copolymer based on ethylene, maleic anhydride and optionally alkyl acrylates or methacrylates, such compositions being especially useful for the manufacture of films having good adhesive properties, as well as for the production of composite films and for the coating of metals. The present invention also relates to filled thermoplastic compositions which may be used for the manufacture of molded articles having improved impact strength.

U.S. Pat. No. 3,410,928 discloses a polymeric composition exhibiting improved adhesivity, printability, grease resistance and stress crack resistance consisting essentially of an intimate mixture of:

(a) from about 20 to about 99 weight percent of a normally solid thermoplastic olefin polymer, having a molecular weight of at least about 10,000 and a melt index of less than about 1,000, such as low density ethylene homopolymer, high density ethylene homopolymer, ethylene/propylene copolymer, ethylene/ethyl acrylate copolymer and the like, and (b) from about 1 to about 80 weight percent of an ethylene/acrylic acid copolymer selected from the group consisting of ethylene/acrylic acid/vinyl acetate terpolymer and ethylene/acrylic acid/alkyl acrylate terpolymer, said ethylene/acrylic acid copolymer having a melt index of less than about 1,000 and containing from about 0.5 to 50 percent by weight of acrylic acid copolymerized therein. However although the properties of such a composition are effectively improved over those of the thermoplastic olefin polymer alone, they are in most cases unsufficient for practical use on an industrial scale, namely for the manufacture of composite films.

U.S. Pat. No. 3,497,574 discloses a polymer composition having improved adhesion comprising a matrix of stereoregular crystalline polyolefin such as polyethylene, said matrix having dispersed therein an amorphous, hydropholic fusible polymer that is non-soluble in the matrix and in an amount between about 2 and 10 weight percent of said composition, such as a copolymer of 50 mole percent of maleic anhydride and 50 mole percent of ethylene. Example 4 of said reference illustrates the use, as such a maleic anhydride/ethylene copolymer, of a medium viscosity resin marketed by Monsanto Chemical Corp. under the trade name DX-840-21 which is a copolymer having an alternate structure.

U.S. Pat. No. 3,765,829 discloses a composition comprising (A) at least one polyolefin and from 2 to 15 percent, by weight of the polyolefin, of (B) a copolymer of ethylene and maleic anhydride having a melt index in the range from 1 to 1,000, the mixture containing 0.1 to 1.5 weight percent of anhydride groups derived from the copolymer (B). Upon crosslinking of said anhydride groups by means of a polyamine, this composition becomes capable of being dyed by means of known basic dyes such as metalliferrous complexes, anthraquinone acid dyes and the like. However the proportion of the ethylene/maleic anhydride copolymer in such a composition is unsufficient to provide a significant improvement in adhesion and/or dynamometric properties.

U.S. Pat. No. 4,275,180 discloses a polymer composition comprising a cross linked blend of an elastomer and a thermoplastic polymer, the elastomer comprising a polymer of ethylene with an ethylenically unsaturated aliphatic ester, the elastomer and the thermoplastic polymer being substantially free of halogen-containing substituents, the elastomer and the thermoplastic polymer being present in a weight ratio of from 4:1 to 1:4 wherein the thermoplastic polymer may be selected from copolymers of olefins and unsaturated polar monomers, ionomers based on a copolymer of ethylene and methacrylic acid, and polyethylenes, especially high density and other linear polyethylenes. Such a composition shows an elongation at break of 110% to 175% when the proportion of the thermoplastic polymer is 33% by weight, and an elongation at break of 250% to 455% when the proportion of the thermoplastic polymer is 50% by weight.

U.S. Pat. No. 4,623,567 discloses a composition comprising from 25 to 95 weight percent of at least one free-radical ethylene polymer and from 5 to 75 weight percent of at least one ethylene/α-olefin copolymer, wherein the α-olefin contains at least four carbon atoms, wherein the copolymer has a specific gravity between 0.905 and 0.940 and a melt index between 0.4 and 3 dg/min., and wherein the free-radical ethylene polymer has a melt index between 0.15 and 3 dg/min. The free-radical ethylene polymer contained in such a composition may comprise small amounts of monomers copolymerizable with ethylene such as ethylenically unsaturated esters, maleic anhydride and the like.

A first aim of the present invention is to provide a thermoplastic composition useful of the production of composite films comprising at least one layer consisting of the said composition and at least one layer consisting of a thermoplastic such as polypropylene, poly-1-butene, poly(meth-4-pentene-1), polyamides, polystyrene, polyvinyl chloride, ethylene/vinyl alcohol copolymers and the like, such composite films being able to exhibit improved peeling strength at the interface between both layers.

A second aim of the present invention is to provide a thermoplastic composition useful for the coating of metals, such as steel tubes or aluminium foils and providing improved peeling strength in such application.

In view to achieve the aforesaid objectives, the present invention provides a thermoplastic composition comprising an uncrosslinked blend of (A) from about 1 to about 80 weight percent of at least one partially crystalline polymer or copolymer of ethylene, having a density lying between 0.870 and about 0.945, and (B) from about 20 to about 99 weight percent of at least one hydrophobic, non elastomeric, random copolymer comprising (i) from about 83 to about 99.7 mole percent of units derived from ethylene, (ii) from 0 to about 14 mole percent of units derived from at least one ester of acrylic or methacrylic acid, and (iii) from about 0.3 to about 3 mole percent of units derived from maleic anhydride, the said copolymer (B) having a melt index in the range of about 1 to 500 dg/min.

The polymer (A) of the composition according to the present invention may be:

either a polymer, obtained by free-radical polymerization under elevated pressure and at an elevated tempeature, comprising at least 98 mole % of ethylene and at most 2 mole % of a polar comonomer such as carbon monoxide, vinyl acetate, alkyl acrylates and alkyl methacrylates where the alkyl group has from 1 to 12 carbon atoms, such polymer generally having a density between about 0.910 and 0.935, or a copolymer, obtained in the presence of a Ziegler type catalyst, comprising a thermoplastic composition comprising at least 79 mole % ethylene units and at most 21 mole % of alpha-olefin units having from 3 to 12 carbon atoms. The said alpha-olefin may be propylene and, in such case, in order to achieve a copolymer (A) having a density lying between 0.870 and 0.945, the said copolymer will generally comprise at least 79 mole % ethylene units and at most 21 mole % propylene units. When the alpha-olefin is 1-butene, in order to achieve a copolymer (A) having a density between 0.870 and 0.945, said copolymer will generally comprise at least about 84 mole % ethylene units and at most about 16 mole % 1-butene units. When the alpha-olefin is methyl-4-pentene-1, in order to achieve a copolymer (A) having a density between 0.870 and 0.945, said copolymer will generally comprise at least about 87 mole % ethylene units and at most about 13 mole % methyl-4 pentene-1 units. When the alpha-olefin is other than hereinabove mentioned, for example 1-hexene, 1-octene or the like, those skilled in the art will easily determine the maximum mole content of said alpha-olefin units in order to achieve a copolymer having a density of at least 0.870. In all cases, it is most essential that copolymer (A) be partially crystalline, i.e. not elastomeric. The minimum density of 0.870 will generally correspond to a degree of crystallinity of at least 5 %. Accordingly the degree of crystallinity will generally be at least 30 % when the density of copolymer (A) is at least 0.905. For most uses of the composition according to the invention, the melt index of copolymer (A), determined under the standard conditions (190° C., sample of 2.16 kg) of ASTM D-1238 will advantageously be selected between about 0.1 and 20 dg/min.

The copolymer (B) of the composition according to the invention may be prepared by direct copolymerization of ethylene, maleic anhydride and optionally acrylic or methacrylic acid ester, for example under high pressure and at high temperature, such a method leading to the obtention of a random copolymer. Suitable high pressure and high temperature processes have been disclosed namely in British Patent No. 2,091,745, U.S. Pat. No. 4,617,366 and U.S. Pat. No. 4,644,044.

The ratio of the standard melt index of copolymer (B) to the standard melt index of polymer (A) will preferably be selected in the range of about 1:6 to about 400:1. The selection of the respective melt indices of polymer (A) and copolymer (B) will of course be adapted to the application for which the composition of the invention is intended.

As already mentioned above, it is most essential that copolymer (B) be non elastomeric, and this is why the total proportion of monomer(s) other than ethylene has been limited to about 17 mole percent. Additionally it is most essential that the blend of (A) and (B) be uncrosslinked, whether chemically or by irradiation.

A second object of the present invention is a filled thermopolastic composition comprising an uncrosslinked blend of (A) from about 67 to about 99 weight percent of at least one partially crystalline polymer or copolymer of ethylene, having a density lying between 0.870 and about 0.945, and (B) from about 1 to about 33 weight percent of at least one hydrophobic, non elastomeric, random copolymer comprising (i) from about 83 to about 99.7 mole percent of units derived from ethylene.

(ii) from 0 to about 14 mole percent of units derived from at least one ester of acrylic or methacrylic acid, and (iii) from about 0.3 to about 3 mole percent of units derived from maleic anhydride. the said copolymer (B) having a melt index in the range of about 1 to 500 dg/min., and the said composition comprising up to about 100 parts by weight per 100 parts by weight of the blend of polymers (A) and (B), of an inorganic filler selected from the group consisting of glass fibres, glass beads, mica, talc, clay, aluminates, silicates, alimina, alumina hydrate, boron fibres, asbestos, the oxide, hydroxide, carbonate and sulfate of magnesium or calcium, the oxides of iron, antimony, zinc or titanium, barium sulfate, bentonite, diatomaceous earth, kaolin, silica, quartz and feldspar. Thus, to the difference of the unfilled compositions of the present invention may comprise, based on the total weight of the uncrosslinked blend, a proportion of copolymer (B) as low as 1 percent. On the other hand, when the weight proportion of said copolymer (B) in the blend is above about 33 percent, the filled composition does not show significant improvement in impact strength any more.

The compositions according to the present invention may be obtained according to any method of preparing uncrosslinked blends, such as:

simultaneous mixing by any known means, especially in a kneading machine or an extruder of polymers (A) and (B) and, optionally, the inorganic filler ;

mixing a master batch of any two components of the composition, when the latter contains an inorganic filler, with the third component of the composition ;

when the composition includes an inorgannic filler, mixing of the polymer (A) and of the inorganic filler previously coated with the copolymer (B), coating having been effected by introducing the filler into a solution of copolymer (B), and then evaporating the solvent. Suitable solutions of copolymer (B) are obtained when the solvent is for example selected from aliphatic, cycloaliphatic and aromatic hydrocarbons having from 5 to 12 carbon atoms, ketones, chlorinated hydrocarbons, acetates and ethers of polyols, and when the concentration of the copolymer (B) in the said solvent does not exceed about 15 % by weight.

The present invention also provides industrial articles obtained by converting a composition as described above.

A first category of such industrial articles includes adhesive films which are able to exhibit good adhesive properties with respect to various substrates such as glass, polypropylene fabric, polyurethane foam and the like. Such films will generally be manufactured from unfilled compositions where the melt index of copolymer (B) is selected between about 1 and 30 dg/min.

Thanks to the good dimensional stability of the compositions according to the invention, films obtained by extrusion-blowing of said compositions (having a thickness generally lying between and 200 μm) may be used for producing articles which are required to support repeated exposure to temperatures lying for example between 110° and 130° C. They can be submitted to any known post-treatment, for sample of the Corona type.

A second category of industrial articles within the scope of the present invention consists of molded articles having improved impact strength, which are useful for any application where such property is required, especially for automobile parts and for the manufacture of household and industrial articles. Such molded articles may be prepared, by any known molding method, from the filled thermoplastic compositions hereinabove described.

A third category of industrial articles within the scope of the present invention consists of composite films comprising at least one layer consisting of an unfilled thermoplastic composition as hereinbefore described and at least one layer consisting of another thermoplastic material such as, for example, polyethylene, polypropylene, poly-1-butene, poly(methyl-4 pentene-1), polyamides, polystyrene, polyvinyl chloride and ethylene/vinyl alcohol copolymers. In such composite films, the thickness of the thermoplastic material layer may be from about 20 μm to about 3000 μm and depends on the thermoplastic material used. For example it usually is from about 20 to 100 μm for low density polyethylene, polypropylene, poly-1-butene, polyamides and ethylene/vinyl alcohol copolymers, from about 25 to 2,000 μm for polyvinyl chloride and from 100 to 3,000 μm for polystyrene. In such composite films, the thickness of the layer consisting of the unfilled thermoplastic composition of the present invention may be suitably from about 5 to 100 μm. Such layer consists of a film which may be produced either by extrusion through a flat die or by extrusion-blowing through a cylindrical die.

The composite films of the present invention may be obtained by co-extruding the unfilled thermoplastic composition and the thermoplastic material by means either of a cylindrical die or a flat die, preferably at a speed of about 2 to 200 meters per minute and at a temperature between 170° C. and 290° C. When using a cylindrical die, a blow-up ratio between 1 and 4 should preferably be selected.

A further useful application of the unfilled thermoplastic composition of the present invention is the coating of a metal by means of a first layer consisting of said composition. For such an application, the thickness of the said first layer should preferably be from about 10 to 500 μm and the melt index of the copolymer (B) component in the thermoplastic composition should preferably be selected from about 2 to 10 dg/min. The said first layer may if necessary be further coated with at least one second layer consisting of another thermoplastic material such as low density polyethylene, the thickness of said second layer being usually from 50 to 5,000 μm and the said second layer thus constituting the external layer of the coated metal. Such additional layer provides an efficient protection against mechanical damage and/or moisture.

For some specific uses within the frame work of this application, such as coating of steel tubes, the coated metal may further comprise, between the metal and the first layer, a layer of a resin intended to improve adhesion such as for example an epoxy resin. In such case the epoxy resin may be mixed with a hardener (e.g. an anhydride or a polyaminoamide) and optionally a cross-linking agent and then applied in the liquid state onto the metal to be coated with a thickness of about 10 and 200 μm. The method of coating a metal with the first layer comprises coating the metal substrate at a temperature between about 140° C. and 300° C. with a film consisting of the unfilled thermoplastic composition described hereinabove, the speed of travel of said metal substrate being between about 1 and 400 meters per minute. The said speed of travel will for example be advantageously selected between 40 and 400 meters per minute in the case of aluminium foils, whereas it will preferably be from about 1 to 10 meters per minute in the case of steel tubes. The metal substrate may be in any form such as plates, sheets or tubes, having a thickness of at least 25 μm. Metals coated according to the invention have varied and widespread uses. For example, aluminium foils coated according to the invention can be used in the food packaging industry for keeping foodstuffs protected from moisture and preserving their aroma. As another example, the coating process according to the invention can be applied to steel pipes, such as pipes for conveying petroleum or gases, making it possible to protect them against oxidation and shocks. In the latter case it is preferred that the terpolymer film be coated with a layer of polyethylene containing a filler such as carbon black. The non-limiting examples which follow are given in order to illustrate the invention. The standards used for measuring the properties of products employed or obtained are as follows:

ASTM D 1238-73 standard for the standard melt index measured at 190° C. under 2.16 kg and expressed in dg/min;

ISO R 179 standard for the Charpy impact resistance expressed in $kJ/m^2$ and measured, with the immediately following exceptions oon a non-grooved test piece of the dimensions $4 \times 6 \times 50$ $mm^3$.

EXAMPLES 1 TO 5

Compositions are prepared by hot kneading of:

x parts by weight of ($A_1$) an ethylene/butyl acrylate copolymer containing 0.44 mole percent of butyl acrylate, having a density of 0.926 and a standard melt index of 0.18 dg/min, and (100-x) parts by weight of (B) a terpolymer containing 92.3 mole percent of groups derived from ethylene, 6.7 mole percent of groups derived from ethyl acrylate and 1 mole percent of groups derived from maleic anhydride, having a standard melt index of 20 dg/min.

The characteristics of the compositions obtained are shown in table 1. The Vicat temperature is measured according to the ASTM D 1525 standard and expressed in degrees Celsius. SD is the dimensional stability measured at 115° C. according to the ASTM D 1204 standard and expressed in %. BS is the breaking strength expressed in MPa and EB is the elongation at break expressed in %, both being determined according to the ASTM D 638 standard. TSC is the critical surface tension expressed in dynes/cm and determined according to the ASTM D 2578 standard. Examples 1 and 5 are comparative examples.

TABLE I

| Example | 1 | 2 | 3 | 4 | 5 |
|---|---|---|---|---|---|
| x | 100 | 75 | 50 | 25 | 0 |
| Vicat | 100 | 83 | 69 | 49 | 47 |
| TSC | 32 | — | 35 | — | 35 |
| SD | −3 | −3 | −6 | −15 | −20 |
| BS | 21 | 17 | 15 | 12 | 10 |
| EB | 650 | 660 | 660 | 740 | 830 |

The composition of example 3 is converted by extrusion-blowing to a 50 μm thick film. This film is used for heat sealing at 145° C. by calendering polyurethane-polyether foam and polypropylene fabric. The following peeling forces, determined according to ASTM D 903-49, are measured:
  between fabric and film:13 N/5 cm;
  between film and foam:8 N/5 cm.

When the film is additionally submitted to a Corona treatment at 45 dynes/cm, the peeling force between film and foam reaches 13 N/5 cm.

A 50 μm thick film of the polymer ($A_1$) along (i.e. corresponding to example 1) leads to a peeling force between film and foam of 2 N/5 cm.

EXAMPLES 6 TO 8

Compositions are prepared by hot mixing of x parts by weight of a copolymer ($A_2$) comprising 99.6 mole % ethylene units and 0.4 mole % 1-butene, obtained by Ziegler type catalysis, having a density of 0.945 and a standard melt index of 0.18 dg/min., and

- (100 x) parts by weight of the terpolymer (B) of example 5.

The Vicat temperature as well as the melting temperature F (expressed in degrees Celsius) of the compositions are reported in table II hereunder. Examples 6 and 8 are comparative examples.

TABLE II

| Example | 6 | 7 | 8 |
|---|---|---|---|
| x | 100 | 50 | 0 |
| F | 130 | 128 | 78 |
| Vicat | 122 | 75 | 47 |

The composition of example 7 is converted by extrusion-blowing into a 50 μm thick film. This film is used for heat sealing at 145° C. by calendering of the polyurethane-polyether foam and the polypropylene fabric. The following peeling forces, determined according to ASTM D 903-49, are measured :
  between fabric and film:10 N/5 cm;
  between film and foam:5.5. N/5 cm.

A 50 μm thick film of polymer ($A_2$) alone (corresponding to example 6) leads to a peeling force between film and foam of 1 N/5 cm.

EXAMPLES 9 TO 13

Compositions are prepared by hot kneading of :

x parts by weight of ($A_3$) a homopolymer of ethylene obtained by free-radical polymerization, having a density of 0.923 and a standard melt index of 3 dg/min., marketed by CdF CHIMIE ETHYLENE & PLASTIQUES under the tradename LOTRENE LD 0304, and (100 x) parts by weight of (B) a terpolymer containing 97.9 mole % of ethylene units, 1.2 mole % of butyl acrylate units and 0.9 mole % of maleic anhydride units and having a standard melt index of 4 dg/min.

The composition is extruded through a flat die to a 35 μm thick film which is coated at 297° C. onto an aluminium foil traveling at a speed of 100 m/min. The adhesion of the composition to the substrate is measured by the peeling force in the longitudinal dimension LPF expressed in N/15 mm and determined according to ASTM D903-49 (width of the polymer web:15 mm instead of 25 mm). The results are reproduced in table III, examples 9 and 13 being given for purposes of comparison.

TABLE III

| Example | 9 | 10 | 11 | 12 | 13 |
|---|---|---|---|---|---|
| x | 100 | 50 | 25 | 15 | 0 |

TABLE III-continued

| Example | 9 | 10 | 11 | 12 | 13 |
|---|---|---|---|---|---|
| LPF | 0.4 | 6.4 | 6.1 | 5.7 | 5.3 |

EXAMPLE 14 (COMPARATIVE)

A composition is prepared consisting of :

50 parts by weight of a copolymer comprising 99 mole % ethylene units and 1 % 1-butene units, having a density of 0.940 and a melt index of 4 dg/min., marketed by CdF CHIMIE ETHYLENE & PLASTIQUES under the tradename LOTREX PG 0456, and 50 parts by weight of alumina hydrate marketed by SAFIC-ALCAN under the tradename HYDRAL 710.

The preparation is carried out by mixing on a calender mixer at a temperature of 180° C. for 15 minutes. From this composition 4 mm thick plates are compression-moulded at 180° C. and subsequently cut into bars of dimensions 4×6×50 mm. The Charpy impact strength measured on these bars is equal to 7.8 kJ/m$^2$ at −30° C.

EXAMPLE 15

Repeating the operating conditions of example 14, a composition is prepared consisting of :

45 parts of the ethylene/1-butene copolymer used in example 14, and 55 parts of the alumina hydrate used in example 14, previously coated with a terpolymer having a melt index of 7.8 dg/min., and consisting of 85.9 mole % of ethylene units, 13 mole % of ethyl acrylate units and 1.1 mole % of maleic anhydride units. The proportion by weight of the terpolymer to the alumina hydrate is 9:91.

The Charpy impact strength of the composition, measured as in example 14, is equal to 55 kJ/m$^2$ at −30° C.

EXAMPLES 16 TO 22

A steel tube is coated with a thin layer of a thermoplastic composition comprising :

x weight % of an ethylene/1-butene copolymer (A) having a melt index (determined according to ASTM D-1238) Mi and a density ρ as indicated in table IV below, and (100-x) weight % of a terpolymer comprising 90.1 weight % ethylene, 6.8 weight % ethyl acetate and 3.1 weight % maleic anhydride and having a melt index of 2 dg/min.

In order to improve adhesion, a thin layer of an epoxy resin is provided between the steel tube and the thermoplastic composition layer, the latter being further coated with a layer of polyethylene.

The peeling force P.F. for each thermoplastic composition is determined at 20° C. according to DIN 30 670 (method n°1) and expressed in kg/5 cm. The values obtained, as well as the proportion x of copolymer (A) in the composition, are reported in table IV below. Example 16 is comparative.

TABLE IV

| Example | 16 | 17 | 18 | 19 | 20 | 21 | 22 |
|---|---|---|---|---|---|---|---|
| x | 0 | 15 | 25 | 5 | 5 | 15 | 5 |
| Mi | — | 3 | 3 | 1 | 3 | 7 | 1,5 |
| ρ | — | 0,900 | 0,900 | 0,900 | 0,880 | 0,921 | 0,935 |
| P.F. | 40 | 200 | 100 | 160 | 80 | 80 | 75 |

EXAMPLES 23 TO 26

An ethylene/vinyl alcohol copolymer (EVOH) marketed by MITSUI PETROCHEMICAL INDUSTRIES Ltd. under the tradename EVAL EPF 101-A on the one hand and a thermoplastic composition comprising:

x weight % of a terpolymer having a melt index of 5 dg/min. and comprising 81 weight % ethylene, 3 weight % maleic anhydride and 16 weight % n-butyl acrylate, and (100-x) weight % of an ethylene/1-butene copolymer ($A_4$) having a melt index (according to ASTM D-1238) of 0.9 dg/min. and a density of 0.910 on the other hand are coextruded at 230° C. at a speed of 9 meters per minute by means of a DOLCI co-extruder in order to obtain a composite film comprising a 20 μm thick layer ofo the EVOH copolymer and a 30 μm thick layer of the thermoplastic composition.

The peeling force P.F. is determined at 17° C., 30 days after co-extrusion, at a drawing speed of 300 mm/min. and expressed in table V below as a function of the proportion x of terpolymer (B) in the thermoplastic composition. Example 23 is comparative.

TABLE V

| Example | 23 | 24 | 25 | 26 |
|---|---|---|---|---|
| x | 0 | 10 | 30 | 40 |
| P.F. | 30 | 70 | 305 | 250 |

EXAMPLES 27 TO 30

A composite film comprising:

a 30 μm thick layer of polypropylene marketed by SOLVAY under the tradename ELTEX PKS 409, an intermediate layer, 10 μm thick, of a thermoplastic composition comprising:

(a) x weight % of the same terpolymer as used in examples 24 to 26, and (b) (100-x) weight % of the ethylene/1-butene copolymer (A) used in examples 23 to 26, and a 20 μm thick layer of the EVOH copolymer used in examples 23 to 26 is prepared by co-extrusion at 230° C. The peeling force P.F. of each composite film is measured, expressed in daN/25 mm, and reported in table VI below. Example 27 is comparative.

TABLE VI

| Example | 27 | 28 | 29 | 30 |
|---|---|---|---|---|
| x | 100 | 70 | 50 | 30 |
| P.F. | 0,12 | 0,16 | 0,24 | 0,16 |

EXAMPLE 31

The operating conditions of examples 28 to 30 are repeated, except that the copolymer ($A_4$) is replaced by a terpolymer ($A_5$) having a melt index of 11 dg/min., a density of 0.896 and comprising 83.8 weight % ethylene, 7.4 weight % propylene and 8.8 weight % 1-butene. The peeling force P.F. of a composite film where the intermediate layer comprises 20 weight % of the said terpolymer ($A_5$) is 0.23 daN/25 mm.

EXAMPLE 32

The operating conditions of examples 28 to 30 are repeated, except that the copolymer ($A_4$) is replaced by a terpolymer ($A_6$) having a melt index of 8 dg/min., a density of 0.900 and comprising 85.5 weight % ethylene, 6.2 weight % propylene and 8.3 weight % 1-butene. The peeling force P.F. of a composite film where the intermediate layer comprises 20 weight % of the said terpolymer ($A_6$) is 0.26 daN/25 mm.

What is claimed is:

1. An industrial article made from a composite film comprising:
    (a) at least one layer comprising a thermoplastic composition, the thermoplastic composition comprising an uncrosslinked blend of:
        (A) from 1 to 80 wt. % of at least one partically crystalline polymer or copolymer of ethylene having a density lying between 0.870 and 0.945;
        (B) from 20 to 99 wt. % of at least one hydrophobic, non-elastomeric, random copolymer comprising:
            (I) from 83 to 99.7 mole % of units derived from ethylene;
            (II) from 0 to 14 mole % of units derived from at least one ester of acrylic or methacrylic acid; and
            (III) from 0.3 to 3 mole % of units derived from maleic anhydride;
        the copolymer (B) having a melt index in the range of 1 to 500 dg/min; and
    (b) at least one layer of another thermoplastic composition.

2. An industrial article made from a metal coated with a layer of a thermoplastic composition, the thermoplastic composition comprising an uncrosslinked blend of:
    (A) from 1 to 80 wt. % of at least one partially crystalline polymer or copolymer of ethylene having a density lying between 0.870 and 0.945; and
    (B) from 20 to 99 wt. % of at least one hydrophobic, non-elastomeric random copolymer comprising:
        (I) from 83 to 99.7 mole % of units derived from ethylene;
        (II) from 0 to 14 mole % of units derived from at least one ester of acrylic or methacrylic acid; and
        (III) from 0.3 to 3 mole % of units derived from maleic anhydride;
    the copolymer (B) having a melt index in the range of 1 to 500 dg/min.

3. An industrial article according to claim 1, wherein the thermoplastic material is selected from polyethylene, polypropylene, poly-1-butene, polyamides and ethylene/vinyl alcohol copolymers and wherein the thickness of the layer consisting of said thermoplastic material is from 20 to 100 μm.

4. An industrial article according to claim 1, wherein the thickness of the layer consisting of the thermoplastic composition is from 5 to 100 μm.

5. An industrial article according to claim 2, wherein the thickness of said layer is from 10 to 500 μm.

6. An industrial article according to claim 2, wherein the melt index of copolymer (B) in the thermoplastic composition is from 2 to 10 dg/min.

7. An industrial article according to claim 2, wherein the coated metal further comprise, between the said metal and the said layer, an intermediate layer of an epoxy resin.

* * * * *

UNITED STATES PATENT AND TRADEMARK OFFICE
CERTIFICATE OF CORRECTION

PATENT NO. : 4,868,052

DATED : September 19, 1989

INVENTOR(S) : Lionel Guerdoux et al.

It is certified that error appears in the above-identified patent and that said Letters Patent is hereby corrected as shown below:

Claim 1, column 10, line 11, change "partically" to --partially--

Signed and Sealed this

Twelfth Day of March, 1991

Attest:

HARRY F. MANBECK, JR.

*Attesting Officer*  *Commissioner of Patents and Trademarks*